United States Patent
Vaez-Iravani et al.

(10) Patent No.: US 11,441,992 B2
(45) Date of Patent: Sep. 13, 2022

(54) METHOD AND APPARATUS FOR DETECTION OF PARTICLE SIZE IN A FLUID

(71) Applicant: Applied Materials, Inc., Santa Clara, CA (US)

(72) Inventors: Mehdi Vaez-Iravani, Los Gatos, CA (US); Todd Egan, Fremont, CA (US); Guoheng Zhao, Palo Alto, CA (US)

(73) Assignee: Applied Materials, Inc., Santa Clara, CA (US)

( * ) Notice: Subject to any disclaimer, the term of this patent is extended or adjusted under 35 U.S.C. 154(b) by 7 days.

(21) Appl. No.: 16/885,257

(22) Filed: May 27, 2020

(65) Prior Publication Data

US 2021/0372911 A1    Dec. 2, 2021

(51) Int. Cl.
*G01N 15/02* (2006.01)
*G01N 15/14* (2006.01)
*G01N 15/00* (2006.01)

(52) U.S. Cl.
CPC ..... *G01N 15/0227* (2013.01); *G01N 15/1434* (2013.01); *G01N 2015/0053* (2013.01); *G01N 2015/0238* (2013.01); *G01N 2015/1438* (2013.01); *G01N 2015/1493* (2013.01)

(58) Field of Classification Search
CPC ........... G01N 15/0227; G01N 15/1434; G01N 2015/0053; G01N 2015/0238; G01N 2015/1438; G01N 2015/1493
USPC ......................................... 356/356, 335–343
See application file for complete search history.

(56) References Cited

U.S. PATENT DOCUMENTS

| | | | | |
|---|---|---|---|---|
| 4,540,283 A | * | 9/1985 | Bachalo | G01N 15/0205 356/28.5 |
| 5,515,163 A | * | 5/1996 | Kupershmidt | G01N 15/0205 356/369 |
| 6,760,107 B1 | | 7/2004 | Drake | |
| 2006/0274309 A1 | * | 12/2006 | Cerni | G01N 15/1459 356/338 |
| 2008/0221711 A1 | * | 9/2008 | Trainer | G01N 15/1459 356/338 |
| 2012/0008143 A1 | * | 1/2012 | Ihlefeld | G01N 15/0205 356/335 |
| 2013/0301047 A1 | | 11/2013 | Bonacina et al. | |

(Continued)

FOREIGN PATENT DOCUMENTS

| | | |
|---|---|---|
| WO | 2017205391 | 11/2017 |
| WO | 2019147321 | 8/2019 |

OTHER PUBLICATIONS

International Search Report and Written Opinion from PCT/US2021/027144 dated Jul. 21, 2021.

*Primary Examiner* — Tri T Ton
(74) *Attorney, Agent, or Firm* — Patterson + Sheridan, LLP (57) ABSTRACT

Examples disclosed herein generally relate to systems and methods for detecting the size of a particle in a fluid. In one example, a system for imaging a particle includes a first imaging device. The first imaging device includes a lens and a digital detector. The system further includes a laser source. He laser source is configured to emit a first laser beam and a second laser beam. The digital detector is configured to accumulate a metric of an intensity of an accumulated light that passes through the lens. The accumulated light is scattered from the particle. The accumulated light includes light from the first laser beam and the second laser beam.

20 Claims, 8 Drawing Sheets

(56) References Cited

U.S. PATENT DOCUMENTS

2019/0224723 A1    7/2019  Mostovoy et al.
2021/0255086 A1*   8/2021  Nakai .................... G01N 15/14

* cited by examiner

METHOD AND APPARATUS FOR DETECTION OF PARTICLE SIZE IN A FLUID

BACKGROUND

Field

Examples disclosed herein generally relate to a method and apparatus for detecting the size of a particle in a fluid.

Description of the Related Art

Detection of particles is important in many areas of technology, including, semiconductor manufacturing. The cause of many defects that are routinely observed in integrated circuit devices can be traced back to the presence of minute particles at some stage of the production. Often, these spurious particles are found floating in the ambient atmosphere, or even in ultra-pure water. These particles may find their way into the production line, and contaminate substrates during the manufacturing process. A variety of techniques have been used to detect these small particles, including methods and devices that measure the diffusion, aerodynamics, optical, or electrical mobility of the particles. While such methods provide useful information about the presence of particles, most conventional methods lack accuracy and precision in determining particle size, making the determination of appropriate corrective actions difficult and challenging.

Particle detection can be performed with a laser light. However, because a cross-sectional area of the laser light has greater intensity at the center than near the peripheral region, it is difficult to distinguish between a small particle that passes through the center of the laser light and a larger particle passing through the peripheral region of the laser light. For example, a smaller particle having a first size passing through the center of the laser light would have the substantially the same level of light scattering as a larger particle that passes through the peripheral region of laser light.

Accordingly, there is a need for a more accurate method and apparatus for detecting the size of a particle in a fluid.

SUMMARY

Disclosed herein are systems and methods for detecting the size of a particle in a fluid. A system for imaging a particle includes a first imaging device. The first imaging device includes a lens and a digital detector. The system further includes a laser source. The laser source is configured to emit a first laser beam and a second laser beam. The digital detector is configured to accumulate a metric of an intensity of an accumulated light that passes through the lens. The accumulated light is scattered from the particle. The accumulated light includes light from the first laser beam and the second laser beam.

In another example, a particle imaging system includes a first imaging device. The first imaging device includes a lens and a digital detector. The particle imaging system includes an encapsulating section. The encapsulating section includes an inlet configured to receive particles and an outlet configure to allow particles to exit the encapsulating section. A laser source is configured to emit a first laser beam and a second laser beam. The digital detector is configured to accumulate a metric of an intensity of an accumulated light that passes through the lens. The accumulated light is scattered from the particle and contains light from the first laser beam and the second laser beam.

In yet another example, a method of determining particle size is disclosed. The method includes emitting a first laser beam and a second from a laser source. The method further includes separating the second laser beam from the first laser beam by a distance. The first laser beam is passed through an encapsulating section. The encapsulating section is configured to allow a particle to flow therethrough. The method continues by accumulating a metric of first intensity of a first light that passes through a lens of an imaging device. The first light is scattered from a particle that passes through the first laser beam. The method further includes accumulating a metric of second intensity of a second light that passes through the lens of the imaging device. The second light is refracted from the particle that passes through the second laser beam. A particle size is classified based upon the first intensity and the second intensity.

BRIEF DESCRIPTION OF THE DRAWINGS

So that the above recited features of the present disclosure can be understood in detail, a more particular description of the disclosure, briefly summarized above, may be had by reference to examples herein, some of which are illustrated in the appended drawings. However, it is to be noted that the appended drawings illustrate only examples and are therefore not to be considered limiting of the disclosure's scope. Accordingly, the appending drawings admit to other equally effective examples.

In order to facilitate understanding, identical reference numerals have been used, where possible, to designate identical elements that are common features. It is contemplated that elements and features of one example may be beneficially incorporated into other examples without further recitation.

DETAILED DESCRIPTION

Examples disclosed herein generally relate to systems and methods for detecting the size of a particle moving through a fluid. The fluid discussed herein is atmospheric air. It should be noted however that the disclosed subject matter has utility with respect to fluids including gases or liquids.

A first laser beam may be configured such that light reflected from a particle is dominated by p-polarized illumination of scattered light. Collecting p-polarized illumination and s-polarized illumination of scattered light scattered from particles provides greater accuracy than conventional systems having scattered light collected from a single laser beam. Passing the particle(s) through a first laser beam and a second laser beam having orthogonal polarization generates two pulses of light. Each of the two pulses of light produce different signal levels at a digital light detector in the form of at least one digital detecting array of an imaging device. Each pulse of scattered light may include p-polarized illumination and s-polarized illumination of scattered light collected from the particle. For smaller particles, p-polarized illumination is greater than s-polarized illumination in the collected scattered light. For medium-sized particles, s-polarized illumination and p-polarized illumination within the scattered light are of similar magnitude. For large particles, s-polarized illumination in the scattered light is greater than the p-polarized illumination within the collected scattered light. By analyzing the intensity of p-polarized illumination and s-polarized illumination, the size of the particle can be determined.

Figure 1:
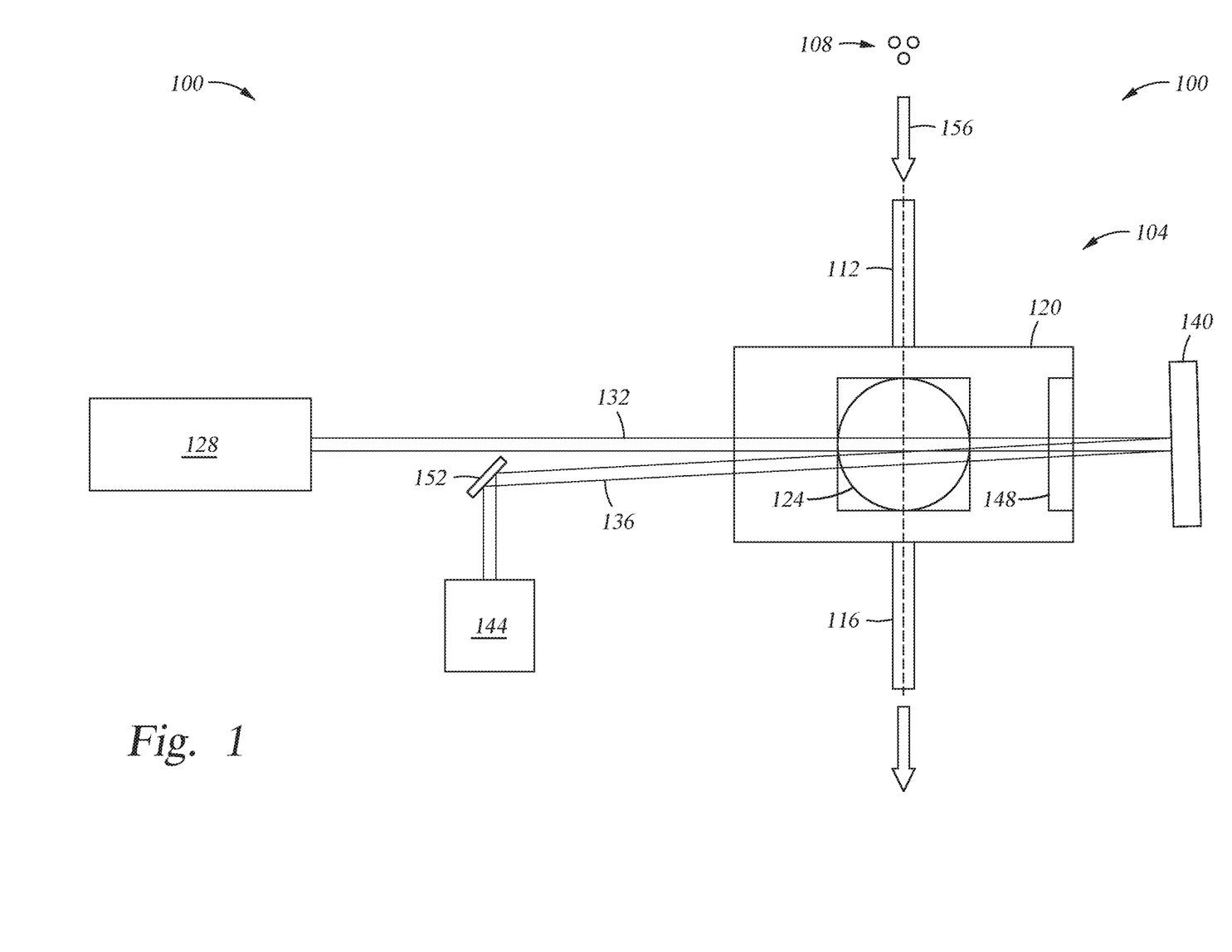
FIG. 1 is a plan view of a particle imaging system having a waveplate.

FIG. 1 is a plan view of a particle imaging system 100 having a waveplate 148. In one example, the waveplate 148 is a quarter-wave plate. The particle imaging system 100 includes a laser source 128, an airflow unit 104, a first reflector 140, an optical absorber 144, and an imaging lens 124.

The air flow unit 104 is disposed between the laser source 128 and the first reflector 140. The air flow unit 104 includes a hollow prism 120. The hollow prism 120 may have six sidewalls, but is not limited to that geometry. An inflow 112 introduces air into the hollow prism 120. Air exits the hollow prism 120 via an outflow 116. The hollow prism 120 is disposed between the laser source 128 and the first reflector 140. The inflow 112 is positioned perpendicular to one of the six sidewalls of the hollow prism 120. The outflow 116 is positioned perpendicular to a different one of the six sidewalls of the hollow prism 120. It should be understood that the terms upstream and downstream are relative terms that do not limit the orientation or position of the inflow 112 or the outflow 116.

Particle(s) 108 disposed in a fluid are introduced to the hollow prism 120 through the inflow 112, and exit the hollow prism 120 through the outflow 116. The particle 108 flows along a path 156 through the airflow unit 104. A pump (not shown) may be coupled to the airflow unit 104 in a manner that facilitates the flow of fluid from the inflow 112, through the hollow prism 120, and out of the outflow 116.

The laser source 128 is configured to emit a first laser beam 132. The first laser beam 132 received by the hollow prism 120. In one example, the first laser beam 132 passes through the hollow prism 120. The waveplate 148 is positioned within the hollow prism 120 proximate an interior wall of the hollow prism 120. However, the waveplate 148 may also be positioned outside of the hollow prism 120 proximate an exterior wall of the hollow prism 120. The first laser beam 132 has a wavelength of $\lambda$. A polarization of the first laser beam 132 is altered by the waveplate 148 into circularly polarized light.

The first reflector 140 is positioned proximate a sidewall of the hollow prism 120. The first reflector 140 has a reflective surface that reflects the trajectory of the first laser beam 132, returning the first laser beam 132 in the direction of the laser source 128.

A second laser beam 136 originates at the first reflector 140. When the reflected first laser beam 132 passes through the waveplate 148 a second time, the polarization of the first laser beam 132 is rotated by about 90 degrees with respect to an original direction of the first laser beam 132. The first laser beam 132 and the second laser beam 136 may have the same wavelength $\lambda$, and the same cross-sectional area A. The double passing of the first laser beam 132 through the waveplate 148 causes the polarization of the second laser beam 136 to be rotated about 90 degrees with respect to the first laser beam 132. Thus, the first laser beam 132 and the second laser beam 136 have orthogonal polarizations. The first laser beam 132 and the second laser beam 136 may have equal power (P), or intensity. In an alternative example, the power of the first laser beam 132 and the second laser beam 136 may have different power (P) or intensity.

The intensity I of the scattered radiation can be expressed by equation 1:

$$I \alpha I_0 \left( \frac{\left(\frac{n}{n_0}\right)^2 - 1}{\left(\frac{n}{n_0}\right)^2 + 2} \right)^2 \left( \frac{d^6}{\left(\frac{\lambda}{n_0}\right)^4} \right)$$

An illumination intensity is represented by $I_0$; n is a refractive index of the particle 108; $n_0$ is a refractive index of the fluid; $\lambda$ is a wavelength of light in a vacuum. Herein the light refers to light from the first laser beam 132 or second laser beam 136. The wavelength $\lambda$ may be any range between the x-ray to far-infrared range. A diameter of the particle 108 is represented by d. Equation 1 describes the scattered intensity I due to a particle having a small diameter d compared with the wavelength $\lambda$ of the laser beams 132, 136. Otherwise stated, the particle is smaller than $\lambda/4$. The illumination intensity $I_0$ is substantially equal to a power (P) of the first laser beam 132 divided by the cross-sectional area (A) of the first laser beam 132. Additionally, a power (P) and cross-sectional area (A) of the second laser beam 136 are expressed in substantially the same manner as determining the power (P) and cross-sectional area (A) for the first laser beam 132. Each of the first laser beam 132 and the second laser beam 136 has a substantially Gaussian cross-sectional distribution area A.

The optical absorber 144 is positioned proximate the laser source 128. A second reflector 152 is oriented to deflect the second laser beam 136 toward the optical absorber 144. A path of the second laser beam 136 begins at the reflector 140. The path of the second laser beam 136 ends at the optical absorber 144. As such, the path of the first laser beam 132 begins at the laser source 128. The path of the first laser beam 132 ends at the first reflector 140. The optical absorber 144 may be positioned between the laser source 128 and the hollow prism 120. However, it is understood that the optical absorber 144 may be positioned at any position that enables the second reflector 152 to direct the second laser beam 136 into the optical absorber 144.

The imaging lens 124 is disposed proximate the hollow prism 120. The imaging lens 124 is positioned substantially perpendicular to the path of the first laser beam 132 and the path of the second laser beam 136. The imaging lens 124 is configured to capture images of the particle(s) 108 as the particle(s) pass through the first laser beam 132 and the second laser beam 136, as discussed below with regards to FIGS. 4-5.

Figure 2:
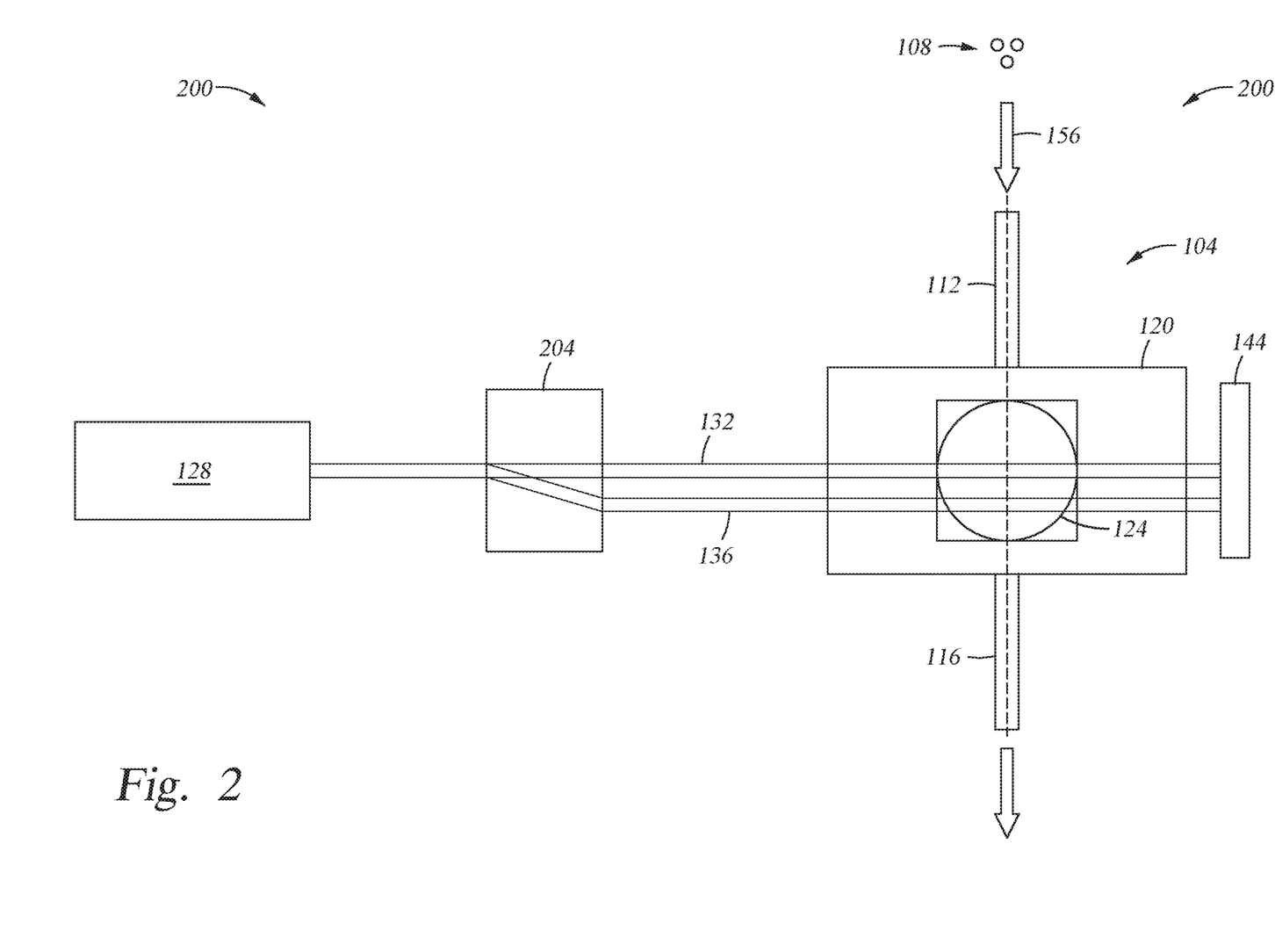
FIG. 2 is a plan view of another particle imaging system having a beam displacer.

FIG. 2 is a plan view of another particle imaging system 200 having the beam displacer 204. The particle imaging system 200 includes the laser source 128, the optical absorber 144, the airflow unit 104, the imaging lens 124, and the beam displacer 204.

The air flow unit 104 is disposed between the laser source 128 and the optical absorber 144. The air flow unit 104 includes the hollow prism 120. The hollow prism 120 is disposed between the laser source 128 and the first reflector 140. As stated above, the inflow 112 is positioned perpendicular to the sidewall of the hollow prism 120. The outflow 116 is positioned perpendicular to another surface of the hollow prism 120. Particle(s) 108 are introduced to the hollow prism 120 through the inflow 112, and exit the hollow prism 120 through the outflow 116.

The beam displacer 204 is arranged between the laser source 128 and the hollow prism 120. The first laser beam 132 is emitted from the laser source 128 and is directed to the beam displacer 204. The beam displacer 204 changes the characteristic of the first laser beam 132 to create the second beam 136. More specifically, when the polarization of the first laser beam 132 is arranged to be at 45 degrees with respect to the horizontal or vertical planes, the beam displacer 204 will split the first laser beam 132 into two components. A first component of the first laser beam 132 will emerge the beam displacer 204 unaltered in direction. The second laser beam 136 emerges from the beam displacer 204 having a trajectory different from the first laser beam 132. The second laser beam 136, which is polarized at 90 degrees with respect to the first laser beam 132, is displaced in a vertical direction with respect to the first laser beam 132. As shown in FIG. 2, the vertical direction is substantially parallel to the path 156 in which the particle(s) 108 propagate.

The optical absorber 144 is positioned proximate an exterior surface of the sidewall of the hollow prism 120. The first laser beam 132 and the second laser beam 136 are absorbed by the optical absorber 144, thus terminating the first laser beam 132 and the second laser beam 136. Accordingly, the optical absorber 144 is positioned next to the hollow prism 120 in a manner that the optical absorber 144 is directly within the path of each of first laser beam 132 and the second laser beam 136. The optical absorber 144 is an optical trap, which absorbs most of the light without impinging on the light absorbed. One example of the optical absorber 144 is a baffle that captures the light of either or the laser beams 132, 136. The optical absorber 144 reduces unwanted background absorbing stray light into the imaging lens 124.

As disclosed above, the imaging lens 124 is positioned substantially perpendicular to the first laser beam 132 and the second laser beam 136. The imaging lens 124 is configured to capture images of the particle(s) 108 as the particle(s) pass through the first laser beam 132 and the second laser beam 136.

Figure 3:
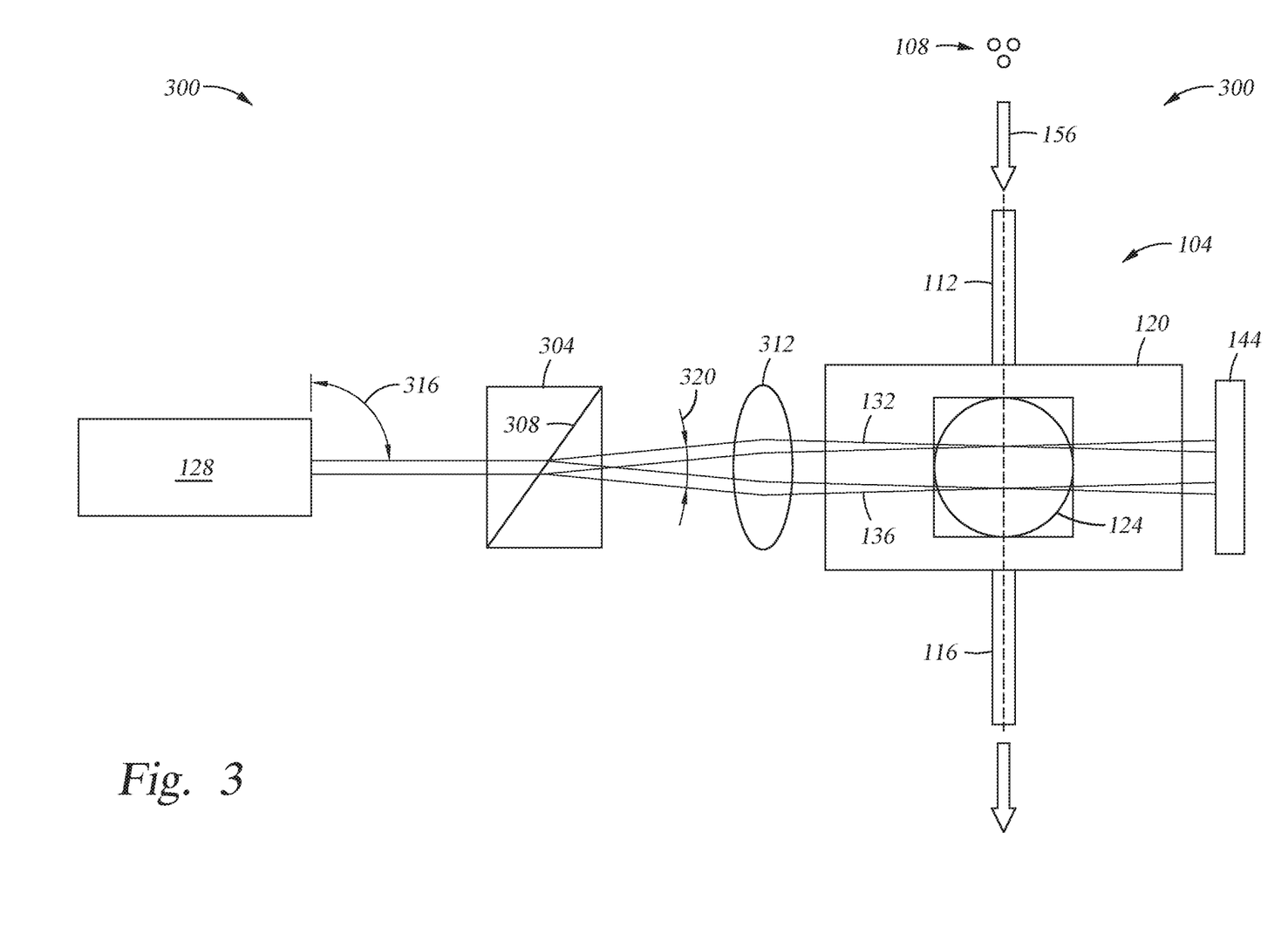
FIG. 3 is a plan view of another exemplary particle imaging system having a prism.

FIG. 3 is a plan view of another exemplary particle imaging system 300 having the prism 304. The particle imaging system 300 includes the laser source 128, the optical absorber 144, the imaging lens 124, the airflow unit 104, a prism 304, and a focusing lens 312.

Similar to the configuration in FIG. 2, the air flow unit 104 is disposed between the laser source 128 and the optical absorber 144. The particle 108 is handled by the airflow unit 104, the inflow 112, outflow 116, and hollow prism 120 in substantially the same manner as disclosed with respect to FIGS. 1-2 above.

The first laser beam 132 is emitted from the laser source in a direction 316 toward the prism 304. The direction 316 is substantially orthogonal to the imaging lens 124. The polarization of the first beam 132 upon entering the prism 304 is arranged at a given angle with respect to a horizontal plane. In one example, the given angle is about 45 degrees.

The prism 304 will split a laser into the first laser beam 132 and the second laser beam 136. The prism 304 is positioned between the laser source 128 and the hollow prism 120. The prism 304 includes a slanted plane 308. The slanted plane 308 separates the first laser beam 132 and the second laser beam 136. The slanted plane 308 is positioned at an angle with respect to the first laser beam 132. The angle of the slanted plane 308 is greater than 0 degrees and less than 90 degrees with respect to the projection angle 316 of the first laser beam 132. Otherwise stated, the slanted plane 308 is neither perpendicular nor parallel to the first laser beam 132. The two emergent laser beams 132, 136 are orthogonally polarized with respect to each other. For example, the first laser beam 132 can be polarized in a horizontal direction while the second laser beam 136 is polarized in a vertical direction. In one example, the prism 304 is a Wollaston prism. Upon passing through the slanted plane 308, a trajectory of the first laser beam 132 is altered by a magnitude. A trajectory of the second laser beam 136 is altered by the same magnitude, such that a downstream angle 320 is formed between the first laser beam 132 and the second laser beam 136 on a downstream side of the slanted plane 308. The downstream angle 320 may vary depending on parameters of the prism 304. In one example, the downstream angle 320 may be between about 20 degrees and about 45 degrees. In another example, the downstream angle 320 is about 20 degrees. In yet another example, the downstream angle 320 is about 30 degrees. In another configuration, the downstream angle 320 is determined by a separation (e.g. distance 556) between the first laser beam 132 and the second laser beam 136, and a field of view of the detecting array 512, 524.

In another example, the prims 304 is a Rochon prism, in which case one of the emergent laser beams 132, 136 after the slanted plane 308 (e.g. first laser beam 132) will be at an angle with respect to the horizontal plane, and the other laser beam (e.g. second laser beam 136) will continue along the horizontal direction. Upon passing through the slanted plane 308, a trajectory of the first laser beam 132 is altered by a magnitude. A trajectory of the second laser beam 136 is not altered. That is the second laser beam 136 will continue along the horizontal direction, such that a downstream angle 320 is formed between the first laser beam 132 and the second laser beam 136 on a downstream side of the slanted plane 308.

As noted above, the first laser beam 132 and the second laser beam 136 are separated by a slanted plane 308. Upon passing through a focusing lens 312, the first laser beam 132 and the second laser beam 136 are oriented substantially parallel to each other, and separated by a distance (explained in detail below). The focusing lens 312 is positioned between the prism 304 and the hollow prism 120. The focusing lens 312 is used to change the trajectory of the first laser beam 132 parallel to the projection angle β on the upstream side of the slanted plane 308. The trajectory of the second laser beam 136 is also changed by the focusing lens 312. On the downstream side of the focusing lens 312, the first laser beam 132 is substantially parallel to the second laser beam 136. Accordingly, on the downstream side of the focusing lens 312, the first laser beam 132 is projected at the projection angle 316. The second laser beam 136 is parallel to the projection angle 316 on the downstream side of the focusing lens 312.

Similar to the configuration of FIG. 2, the optical absorber 144 of FIG. 3 is positioned proximate the hollow prism 120. The first laser beam 132 and the second laser beam 136 are absorbed by the optical absorber 144. As disclosed above, the particle 108 is handled by the airflow unit 104, the inflow 112, outflow 116, and hollow prism 120. And, the imaging lens 124 is configured to receive light scattered from the particle(s) 108 as the particle(s) 108 pass through the first laser beam 132 and the second laser beam 136.

Figure 4:
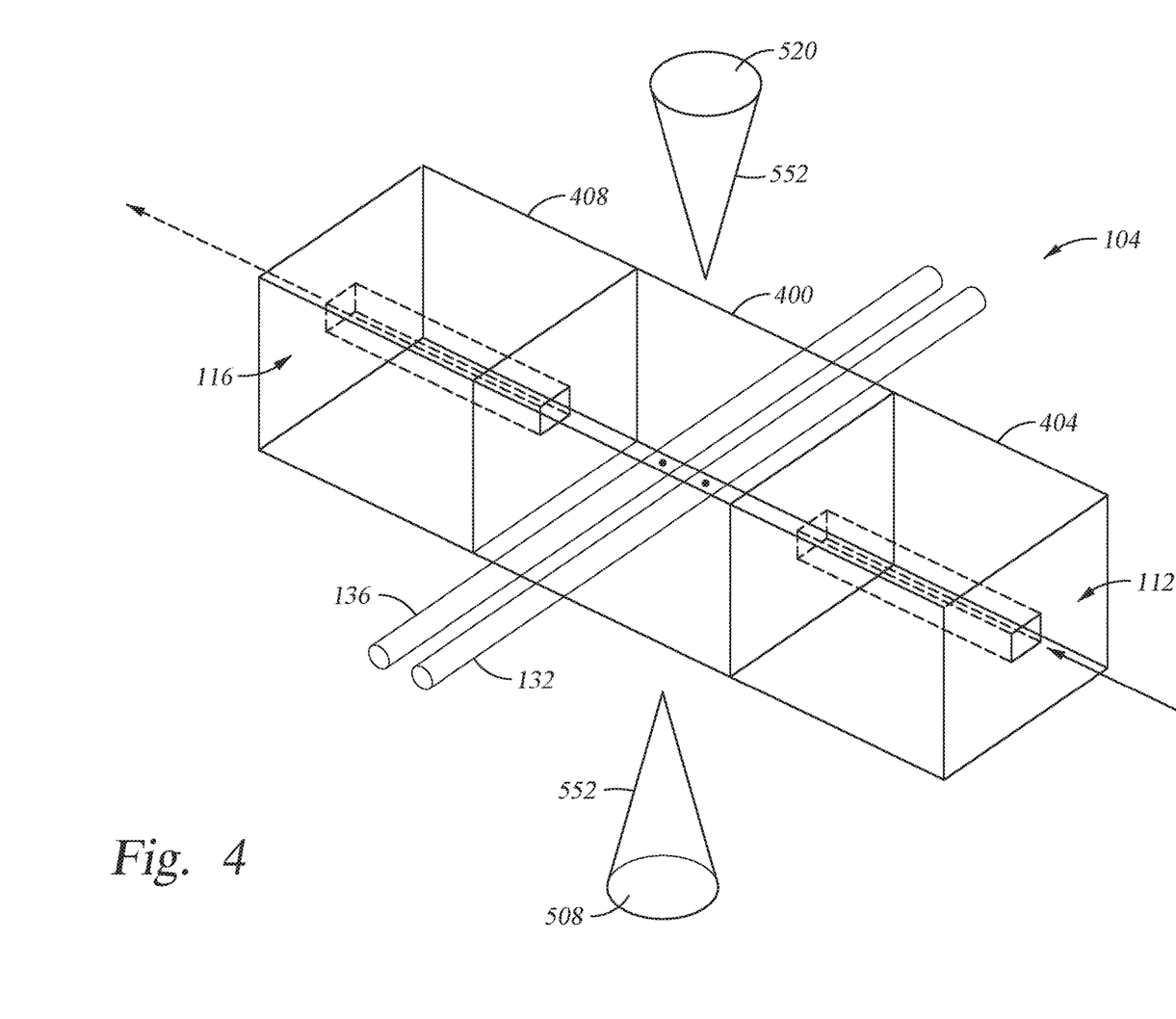
FIG. 4 is a three-dimensional plan view of the air flow unit suitable for flowing particles in any of the particle imaging systems of FIGS. 1-3.

FIG. 4 is a three-dimensional plan view of the air flow unit 104 suitable for flowing particle(s) 108 in any of the particle imaging systems of FIGS. 1-3. The air flow unit 104 includes an encapsulating section 400 that is disposed between an opening portion 404 and end portion 408.

The inflow 112 is disposed within the opening portion 404 and introduces particle(s) 108 into the encapsulated section 400. The particles 108 are removed from the encapsulated section 400 through the outflow 116 that is disposed within the end portion 408. While the opening portion 404 and end portion 408 are shown as substantially parallelograms, neither the opening portion 404 nor the end portion 408 are limited to this configuration. The opening portion 404 and end portion 408 may be any geometric shape that facilitates the movement of particles 108 through the encapsulated section 400.

Each of the first laser beam 132 and the second laser beam 136 passes through the encapsulated section 400. The particles 108 pass through the encapsulated section 400 in a path substantially perpendicular to the first laser beam 132 and the second laser beam 136. The first laser beam 132 and second laser beam 136 are projected through the encapsulated section 400 and incident on the path in such a manner that the particle(s) 108 pass through both the first laser beam 132 and the second laser beam 136.

The encapsulated section 400 may be formed by six sidewalls, which may be made from a substantially transparent material such as glass, quartz, plastic, or other suitable material that permits light to pass therethrough. The first laser beam 132 passes through a first sidewall and exits through a second sidewall of the encapsulated section 400. The second sidewall is substantially opposite the first sidewall. The second laser beam 136 also passes through the first sidewall of encapsulated section 400. The second laser beam 136 also exits through the second sidewall of the encapsulated section 400. In another example, the second laser beam 136 is reflected back through the encapsulated section 400, passing through the second sidewall and subsequently passes through the first sidewall of the encapsulated section 400.

As stated above, in a different example, the pump (not shown) may be coupled to the air flow unit 104. The pump is configured to cause the fluid that carries particle(s) 108 to flow into the opening portion 404 through the encapsulated section 400 and flow out of the end portion 408.

Herein, any description of the imaging lens 124 necessarily includes either or both of a first imaging lens 508 or a second imaging lens 520. Accordingly, the imaging lens 124 illustrated of FIGS. 1-3 can be either of the first imaging lens 508 or the second imaging lens 520, illustrated in FIGS. 4-5. The first imaging lens 508 is positioned substantially orthogonal to one of the sidewalls of the encapsulated section 400. The second imaging lens 520 is positioned substantially orthogonal to one of the other sidewalls of the encapsulated section 400. The first laser beam 132 and the second laser beam 136 are each arranged in a substantially orthogonal orientation with respect to the imaging lens(es) 124. The imaging lens(es) 124 collects scattered light 552 from the particle 108.

Figure 5:
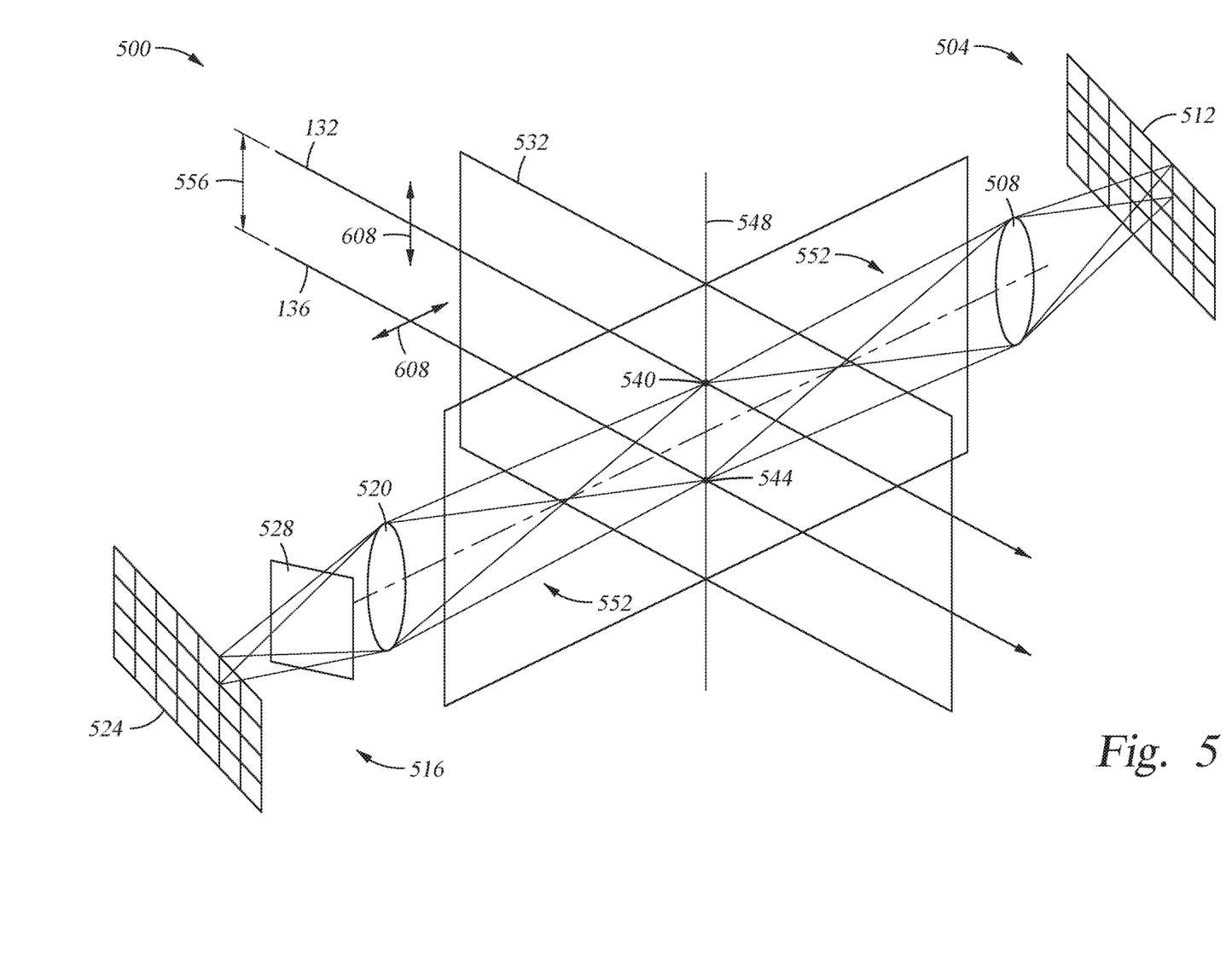
FIG. 5 is a plan view of a particle imaging system having two imaging devices that are suitable for use with any of the particle imaging systems illustrated in FIGS. 1-3.

FIG. 5 is a plan view of a particle imaging system 500 having two imaging devices that are suitable for use as any of the particle imaging systems illustrated in FIGS. 1-3, among other suitable system. The airflow unit 104 is not shown in FIG. 5 for simplicity. The particle imaging system 500 includes a first imaging device 504 and a second imaging device 516.

The first imaging device 504 has a first imaging lens 508 and a first detecting array 512. The second imaging device 516 has a second imaging lens 520 and a second detecting array 524. Each of the first detecting array 512 and the second detecting array 524 is an n×m array, having n pixel rows and m pixel columns. The first detecting array 512 and/or the second detecting array 524 can be a CCD or CMOS imaging array. A value for either n or m may be between a small single-digit number and several thousand. In one example, a digital detector is the first detecting array 512.

An attenuator 528 may be placed between a particle 540 and the second detecting array 524. The attenuator 528 is positioned between the second imaging lens 520 and the second detecting array 524. The attenuator 528 enables the second detecting array 524 to increase the range of particle(s) 108 sizes which can be detected before saturation of the second detecting array 524. For example, when the attenuator 528 is utilized, the second detecting array 524 can detect particles 108 within a range of about 100 nm to about 900 nm. Within this range, the second detecting array 524 can detect scattered light due to both p-polarized illumination and s-polarized illumination within scattered light 552 from the particle 108. The attenuator 528 may be colored, stained, and/or tinted transparent material such as glass, plastic, or quartz. The attenuator 528 may reduce the magnitude of the scattered light from the particle 108 due to first laser beam 132 and second laser beam 136 by about a factor of 100, compared to a case in which the attenuator 528 is not used. In another example, the digital detector is the second detecting array 524.

Scattered light 552 is collected by the first imaging lens 508 of the first imaging device 504. Scattered light 552 creates a voltage within the first imaging device 504, and a corresponding signal is stored on the first detecting array 512. Separately, the second imaging device 516 captures the scattered light 552 via the second imaging lens 520. The scattered light 552 may pass through the attenuator 528 before the scattered light 552 impinges on the second detecting array causing the array to generate a voltage corresponding to a magnitude of the scattered light 552. A metric corresponding to the magnitude of a voltage is stored with a corresponding value or metric of an n×m pixel of the second detecting array 524. In another example, the current is measured, and a corresponding value or metric is stored on the n×m pixel image. The collected light 552 corresponding to the illumination intensity $I_0$ generates a signal in the detecting array 524. An amount of scattered light 552 collected may also be a function the numerical aperture (NA) of each of the first imaging lens 508 or the second imaging lens 520.

Figure 6A:
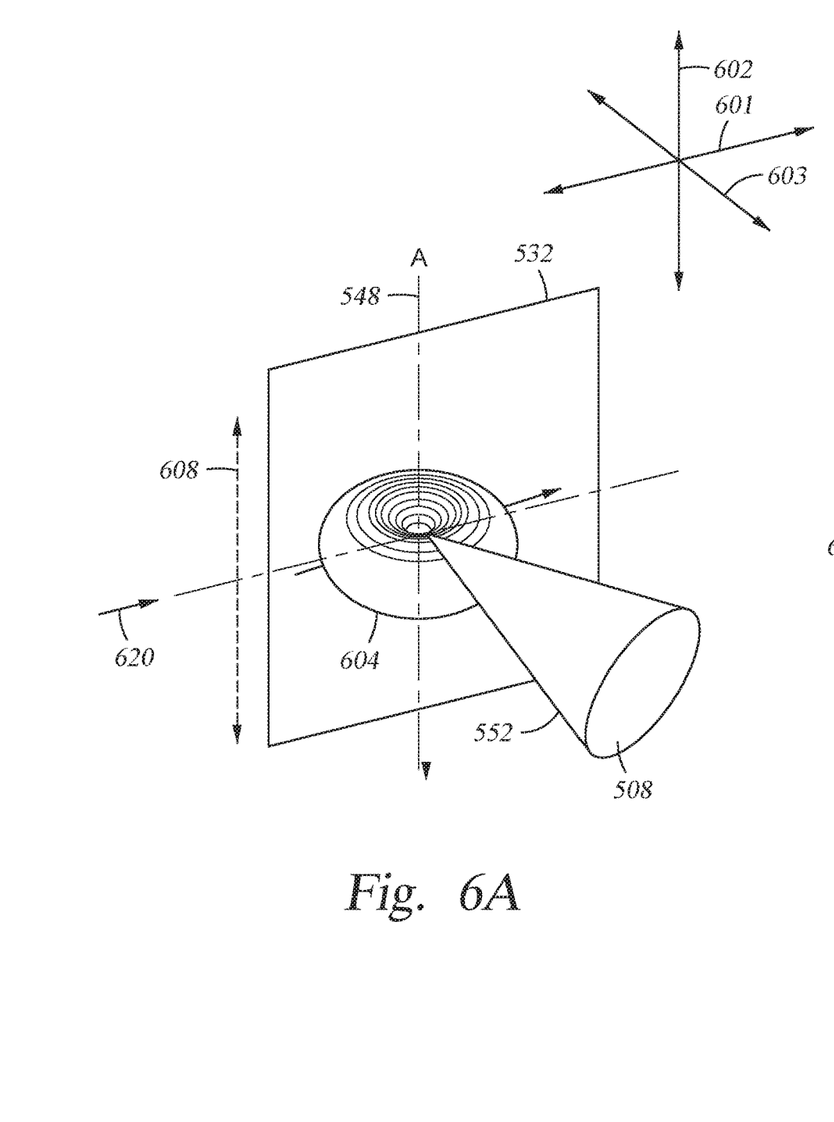
FIGS. 6A-6B are three-dimensional schematic views of light collected a lens by the imaging device of FIG. 5.
Figure 6B:
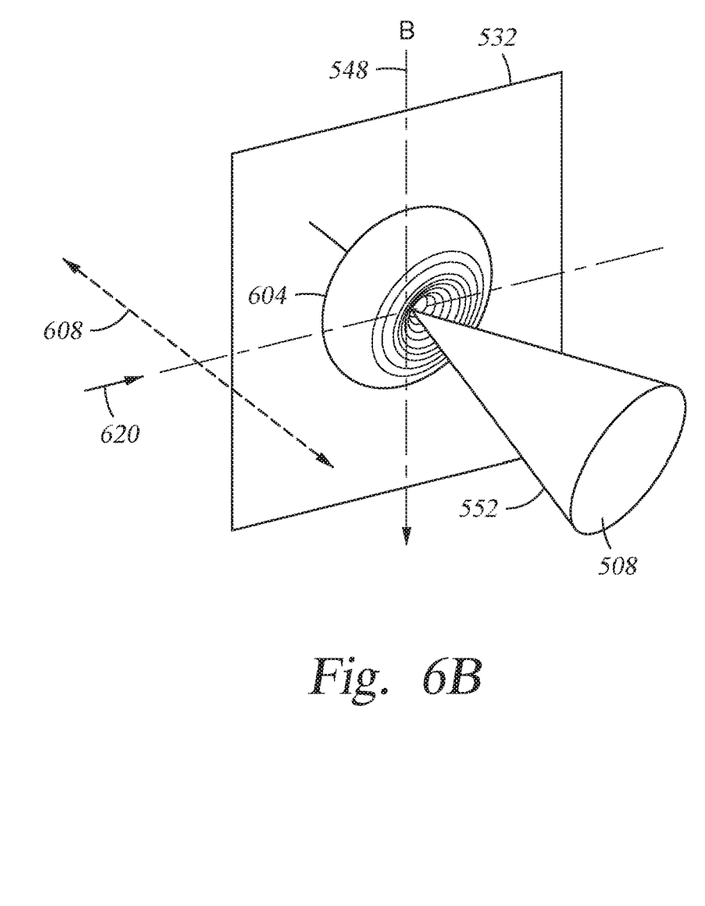

The first laser beam 132 is projected along a first plane 532. The first plane 532 is perpendicular to a direction of propagation of the first laser beam 132. P-polarized illumination is understood to have an electric field direction parallel to a plane of incidence. The plane of incidence is the plane that contains the direction of propagation the first laser beam 132 or the second laser beam 136, and is parallel to the principal planes of the imaging lens 124 (explained in detail below). Herein, the laser beam refers to both of the first laser beam 132 and the second laser beam 136. The electric field of the s-polarized illumination is oriented perpendicular to the plane of incidence. As shown in FIGS. 6A-6B, the first plane 532 includes a polarization direction of illumination 608.

The particle 540 travels along a path 548. For clarity, the particle 108 is illustrated as particle 540 at first position p(t1), and is shown as particle 544 at a second position p(t2), where t is time. As shown in FIG. 4, the particle 540 passes through the first laser beam 132 at the first position p(t1). The displaced particle 544 passes through the second laser beam 136 at the second position p(t2). A distance 556 separates the first laser beam 132 from the second laser beam 136. Accordingly, the particle 108 (shown in FIGS. 1-3) travels the distance 556 between the first position p(t1) and the second position p(t2).

The distance 556 is measured relative to a beam width (i.e. the cross-sectional area A) of the first laser beam 132 or the second laser beam 136. The distance 556 may be between 2 to 3 times the beam width of the first laser beam 132. Alternatively, the distance 556 may be determined relative to the second laser beam 136.

The passage of the given particle 540 through the first laser beam 132 at position p(t1) will create a pulse of scattered light 552 due to scattering by p-polarized illumination of the scattered light 552. The pulse of light is converted to the metric (e.g. voltage or current), and the metric is stored as a signal P1 on the output of the first detecting array 512. The second detecting array 524 stores the metric corresponding to the intensity of the pulse of light as a signal P2.

When the particle 544 passes through the second laser beam 136 at position p(t2), a pulse of scattered light 552 includes s-polarized illumination of the scattered light 552 scattered from the particle 544. The pulse of light can be converted to voltage or current having a metric, the metric is then stored as a signal S1 at the output of the first detecting array 512. The second detecting array 524 stores the pulse of light as a signal S2. The two pulses of scattered light 552 will produce different signal levels at each of the first detecting array 512 and the second detecting array 524.

FIGS. 6A-6B are three-dimensional schematic views of light collected by any one of the imaging devices shown in FIG. 5. An x-direction 601 and a y-direction 603 are shown; the x-direction 601 is orthogonal to the y-direction 603. A z-direction is perpendicular to both the x-direction 601 and the y-direction 603.

As the particle 108 passes through the particle imaging system 500 shown in FIG. 5, a radiation profile 604 is created. For simplicity, the particle 108 is not shown in FIGS. 6A-6B. However, it is understood that the particle 108 is positioned at a center of the radiation profile 604. As the particle 108 travels through either the first laser beam 132 or the second laser beam 136, the radiation profile 604 is generated by the scattered light 552. The radiation profile 604 is substantially in the shape of a toroid, i.e. donut-shaped. Accordingly, the radiation profile 604 extends in each one of the x-direction 601, y-direction 603, and z-direction 602. Herein, scattered light 552 scattered from the particle 108 is governed by the Mie theory where the particle 108 has a small diameter d (e.g., d<$\lambda$/4), where $\lambda$ is the wavelength of light. The light is either the first laser beam 132 or the second laser beam 136. Where the diameter (d) of the particle 108 is small, e.g., the diameter d is less than $\lambda$/4 (i.e., d<$\lambda$/4), Rayleigh scattering governs the theory of scattered light 552.

In one example, the polarization direction of illumination 608 refers to a polarization of the first laser beam 132. The polarization direction of illumination 608 is also the direction of an electric field. The polarization direction of illumination 608 is coplanar with the first plane 532. For p-polarized illumination, the polarization direction of illumination 608 is perpendicular to the direction of propagation 620 the first laser beam 132. The polarization direction of illumination 608 is parallel to the path 548 of the particle 108 as the particle 108 passes through the encapsulated section 400 (shown in FIG. 4). In another example, the polarization direction of illumination 608 refers to a polarization of the second laser beam 136.

The amount of the scattered light of the particle 108 depends on the size of the particle 108, the intensity $I_p$ of p-polarized illumination, and the intensity $I_s$ of the s-polarized illumination within the scattered light 552. In some examples, the intensity $I_p$ of p-polarized illumination may be substantially equal to intensity $I_s$ of s-polarized illumination within the scattered light 552.

In FIG. 6A, first laser beam 132 travels along the direction of propagation 620. The direction of propagation 620 is parallel to the x-direction 601. A polarization direction of illumination 608 of laser light from the first laser beam 132 is along the z-direction 602, which is parallel to the path 548. As noted, the particle(s) 108 travels along the path 548. The polarization direction of illumination 608 of the first laser beam 132, and direction of propagation 620 define a plane of incidence 532. The plane of incidence 532 is coplanar to a plane defined by the x-direction 601 and the z-direction 602. For a small particle 108, a shape of a scattered field from the particle 108 is in the form of a toroid 604. A portion of the scattered field is collected by the first imaging lens 508 in the form of a cone of light (i.e. scattered light 552). In FIG. 6A, the polarization of the illumination is referred to as P-polarized.

In FIG. 6B, the second laser beam 136 travels along the direction of propagation 620. The polarization direction of illumination 608 of laser light from the second laser beam 136 is now perpendicular to the plane of incidence 532. Scattered radiation for the particle(s) 108 has the same toroid 604 shape, as shown in FIG. 6A, except that incident light is rotated by 90 degree. Accordingly, the toroid 604 in FIG. 6B is rotated by 90 degree from the toroid 604 illustrated in FIG. 6A. The polarization of the illumination shown in FIG. 6B is referred to as S-polarized.

Figure 7:
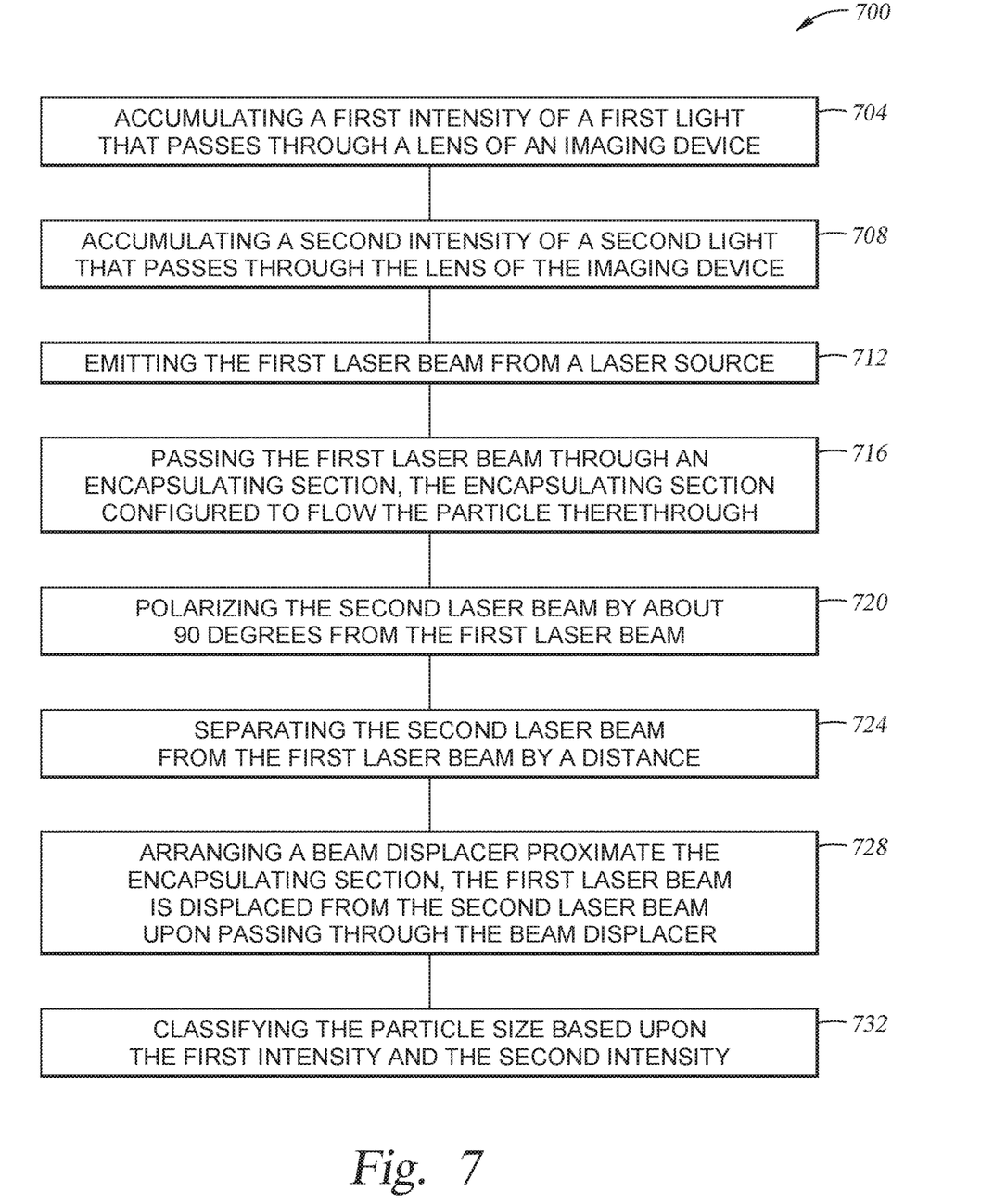
FIG. 7 is a flow diagram of a method of determining the size of a particle.

FIG. 7 is a flow diagram of a method 700 of determining the size of the particle 108. At block 704, the metric corresponding to a first intensity of scattered light 552 from the first laser beam 132 is accumulated by the first imaging device 504. The scattered light 552 having passed through a first imaging lens 508 of a first imaging device 504. The particle 108 passes through the first laser beam 132 causing light to be scattered from the particle 108. At block 708, the metric corresponding to a second intensity of scattered light 552 is accumulated by the first imaging device 504 when the particle 108 passes through the second laser beam 136. Alternatively, the second imaging device 516 accumulates the metric corresponding to the intensity of scattered light 552 of particle 108. The first laser beam 132 is emitted from the laser source 128 at block 712. The second laser beam 136 is generated from the first laser beam 132 after passing the first laser beam 132 through the waveplate 148. The polarization of the second laser beam 136 is rotated by about 90 degrees from the first laser beam 132. Accordingly, the second laser beam 136 has different characteristics from the first laser beam 132. Alternatively, the first laser beam 132 is passed through the beam displacer 204. In another example, the first laser beam 132 is passed through the prism 304.

At block 716, the first laser beam 132 is passed through an encapsulating section 400. The encapsulating section 400 is configured to flow the particle 108 therethrough.

At block 720, the second laser beam 136 is polarized by about 90 degrees from the first laser beam 132. The second laser beam 136 is polarized upon passing through the waveplate 148. Alternatively, the second laser beam 136 is polarized by the beam displacer 204. The prism 304, in another example, polarizes the second laser beam 136 about 90 degrees with respect to the first laser beam 132.

The distance 556 is established to separate the second laser beam 136 from the first laser beam 132, at block 724. At block 728, first laser beam 132 passes through the beam displacer 204. The beam displacer 204 may be disposed between the encapsulating section 400 and the laser source 128. The first laser beam 132 is displaced from the second laser beam 136 upon passing through the beam displacer 204, shown in FIG. 2. In another example, the reflection of the first laser beam 132 from the first reflector 140, which is held at a slight off-normal angle, separates the first laser beam 132 from the second laser beam 136 by the distance 556, as demonstrated in FIG. 1. The distance 556 between the first laser beam 132 and the second laser beam 136 may also be established by the prism 304, illustrated in FIG. 3.

At block 732, the particle 108 is classified based upon the scattered light 552. Classifying the particle(s) 108 by size includes sorting information representative of each particle into bins or categories. In this example, the attenuator 528 is positioned between the second imaging lens 520 and the second detecting array 524. As stated above, P1 which refers to metric corresponding to an intensity of light scattered by a particle 108 from the p-polarized light is stored as the signal on the first detecting array 512. The second detecting array 524 stores the metric corresponding to intensity of the pulse of light as a signal P2 from the same p-polarized laser light beam. The pulse of light is stored as metric corresponding to the intensity of the pulse of light scattered from the second, s-polarized laser light beam, as a signal S1 in the first detecting array 512. The second detecting array 524 stores the metric corresponding to the pulse of light as a signal S2, also due to scattered light from the second laser light beam. A controller 800, shown in FIG. 8, may classify information representative of the particles 108 into bins according to a size of the particle 108. Table 1 is a logic table illustrating how signals P1, S1, P2, and S2 are used to classify the size of a particle 108. Table 1 is stored in the memory 808 of the controller 800.

For example, the particle 108 passes through the first laser beam 132 and the second laser beam 136 generating two pulses. The metrics corresponding to intensity of the pulses are stored as signals on each of the first detecting array 512 and the second detecting array 524. For the particle 108 having a size between about 50 nm to 100 nm, the intensity $I_p$ of the p-polarized illumination scattered as light 552 is greater than the intensity $I_s$ of the s-polarized illumination. Accordingly, the first detecting array 512 detects the signal P1, but the signal S1 is negligible. The second detecting array 524 does not detect the signal P2 or the signal S2.

For particles greater than about 110 nm and less than about 200 nm, the s-polarized illumination scattered light 552 becomes detectable by the first detecting array 512. The intensity $I_p$ of the p-polarized illumination scattered light 552 saturates the first detecting array 512, for particles greater than about 110 nm and less than about 200 nm. The scattered light 552 due to s-polarized illumination remains detectable for particle(s) 108 having a size up to about 200 nm. As such, the signal P1 saturates the first detecting array 512. The signal S1 is detectable at the first detecting array 512. The second detecting array 524 can detect the signal P2. However, the signal S2 is not detectable at the second detecting array 524.

For particle(s) 108 that have a size above 200 nm, p-polarized illumination, scattered as the scattered light 552, saturates the first detecting array 512. Additionally, s-polarized illumination scattered as the scattered light 552 saturates the first detecting array 512. Within the second detecting array 524, the intensity $I_p$ of the light scattered due to p-polarized illumination is detectable. The intensity $I_s$ of the light scattered due to s-polarized illumination is also detectable at the second detecting array 524. Therefore, the signal P1 saturates the first detecting array 512. The signal S1 saturates the first detecting array 512. The second detecting array 524 can detect the signal P2. The signal S2 is detectable at the second detecting array 524.

In one example, the intensity $I_p$ of the scattered light 552 due to p-polarized illumination is greater than the intensity $I_s$ of the scattered light 552 due to s-polarized illumination by at least one order of magnitude. Otherwise stated, the intensity $I_p$ of the p-polarized illumination may be up to ten times the magnitude of the intensity $I_s$ of s-polarized illumination. The size of the particle 108 may be less than 200 nm. In another example, where the magnitude of the intensity $I_s$ of scattered light 552 due to s-polarized illumination is greater than the intensity $I_p$ of scattered light 552 due to the p-polarized illumination, the size of the particle 108 may be greater than about 200 nm.

TABLE 1

| P1 | S1 | P2 | S2 | Diameter |
|---|---|---|---|---|
| Detected | N/A | N/A | N/A | 50 nm ≤ d < 110 nm |
| Saturated | Detected | Detected | N/A | 110 nm ≤ d < 200 nm |
| Saturated | Saturated | Detected | Detected | d > 200 nm |

Figure 8:
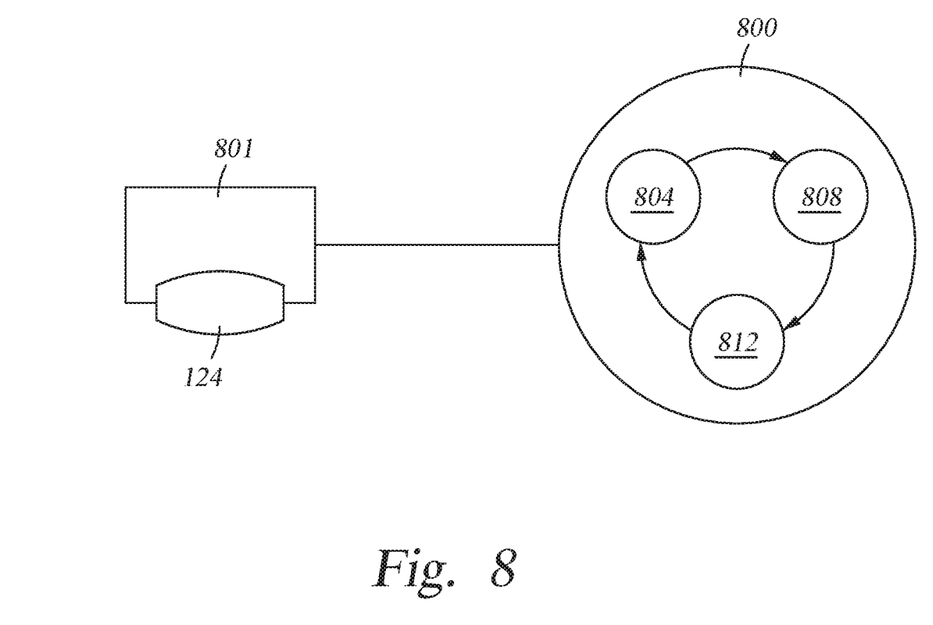
FIG. 8 is a plan view of an imaging device used to measure light scattered from the particle imaging system of FIGS. 1-5.

FIG. 8 is a plan view of the first imaging device 504 used to measure light scattered from the particle imaging system of FIG. 5. The first imaging device 504 in some examples is a camera 801 that is coupled to a controller 800. The controller 800 includes a processor 804, a memory 808, and support circuits 812 that are coupled to one another. The controller 800 may be on-board the camera 801, or in an alternative example, the controller 800 may be on-board a remote device (not shown) that receives images from the camera 801. The camera 801 has at least one imaging lens 124 that is configured to capture images of the particle imaging system 100, disclosed herein.

The first imaging device 504 includes an input control unit, such as power supplies, clocks, cache, input/output (I/O) circuits, coupled to the various components of the first imaging device 504 to facilitate control thereof. Optionally, first imaging device 504 can include a display unit (not shown). The processor 804 may be one of any form of general purpose microprocessor, or a general purpose central processing unit (CPU), each of which can be used in an industrial setting, such as a programmable logic controller (PLC). It is understood that the controller 800 may also be coupled to the second imaging device 516 in substantially the same manner as the first imaging device 504.

The memory 808 is non-transitory and may be one or more of readily available memory such as random access memory (RAM), read only memory (ROM), or any other form of digital storage, local or remote. The memory 808 contains instructions, that when executed by the processor 804, facilitates the operation of the first imaging device 504. The instructions in the memory 808 are in the form of a program product such as a program that implements the method of the present disclosure. The program code of the program product may conform to any one of a number of different programming languages. Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are examples of the present disclosure.

In one example, the disclosure may be implemented as the program product stored on a computer-readable storage media (e.g. 808) for use with a computer system (not shown). The program(s) of the program product define functions of the disclosure, described herein. The programs/instructions include algorithms that are configured to process light collected from particle imaging systems shown in FIGS. 1-5.

Examples disclosed herein generally relate to a method and apparatus for detecting the size of a particle moving through the fluid. While the foregoing is directed to specific examples, other examples may be devised without departing from the basic scope thereof, and the scope thereof is determined by the claims that follow.

What we claimed is:

1. A system for imaging a particle, comprising:
    a first imaging device comprising:
        a lens; and
        a digital detector; and
    a laser source configured to produce a first laser beam and a second laser beam, wherein the digital detector is configured to accumulate a metric of an intensity of an accumulated light that passes through the lens, the accumulated light is refracted from the particle, the accumulated light comprising light from the first laser beam passing through the lens and accumulated by the digital detector at a first time and comprising light from the second laser beam passing through the lens and accumulated by the digital detector at a second time occurring after the first time.

2. The system for imaging a particle as recited in claim 1, comprising:
    a laser terminator disposed in a path of the first laser beam and a path of the second laser beam, the laser terminator configured to interrupt the paths of the first and second laser beams.

3. The system for imaging a particle as recited in claim 1, comprising:
    an encapsulating section having an inlet for receiving the particle and an outlet for allowing the particle to exit the encapsulating section through the outlet.

4. The system for imaging a particle as recited in claim 3, comprising:
    a beam displacer disposed between the laser source and the encapsulating section, the beam displacer configured to displace the first laser beam from the second laser beam.

5. The system for imaging a particle as recited in claim 3, comprising:
    a beam displacer inside the encapsulating section, the beam displacer configured to displace the first laser beam from the second laser beam.

6. The system for imaging a particle as recited in claim 3, comprising:
    a beam displacer disposed between the laser source and the encapsulating section, the beam displacer configured to displace the first laser beam from the second laser beam; and
    a focusing lens disposed between the laser source and the encapsulating section.

7. The system for imaging a particle as recited in claim 6, wherein the beam displacer is configured to cause the second laser beam to polarize about 90 degrees from the first laser beam.

8. The system for imaging a particle as recited in claim 1, wherein the second laser beam is displaced from a direction of the first laser beam, and the second laser beam is polarized at about 90 degrees with respect to a polarization of the first laser beam by a beam displacer.

9. The system for imaging a particle as recited in claim 1, comprising:
    an encapsulating section configured to receive the first laser beam and the second laser beam;
    a first reflector configured to reflect the first laser beam; and
    a laser terminator configured to interrupt a path of the second laser beam.

10. The system for imaging a particle as recited in claim 1, comprising:
    an encapsulating section configured to receive the first laser beam and the second laser beam; and
    a laser terminator configured to interrupt a path of the first laser beam and the second laser beam.

11. The system for imaging a particle as recited in claim 1, comprising:
    an encapsulating section configured to receive the first laser beam and the second laser beam;
    a beam displacer configured to displace the first laser beam from the second laser beam; and
    a laser terminator configured to interrupt a path of the second laser beam.

12. The system for imaging a particle as recited in claim 1, comprising:
    a beam displacer configured generate and to displace the first laser beam from the second laser beam; wherein a polarization of the second laser beam is rotated by about 90 degrees with respect to that of the first laser beam.

13. A particle imaging system, comprising:
    a first imaging device including:
        a lens; and
        a digital detector;
    an encapsulating section including an inlet configured to receive particles and an outlet configured to allow particles to exit the encapsulating section; and
    a laser source configured to produce a first laser beam and a second laser beam, wherein the digital detector is configured to accumulate a metric of an intensity of an accumulated light that passes through the lens, the accumulated light is diffracted from the particle and contains light from the first laser beam passing through the lens and accumulated by the digital detector at a first time and contains light from the second laser beam passing through the lens and accumulated by the digital detector at a second time occurring after the first time.

14. The particle imaging system as recited in claim 13, comprising:
a beam displacer disposed between the laser source and the encapsulating section, the beam displacer configured to displace the first laser beam from the second laser beam.

15. The particle imaging system as recited in claim 13, comprising:
a beam displacer disposed inside the encapsulating section, the beam displacer configured to displace the first laser beam from the second laser beam.

16. The particle imaging system as recited in claim 13, comprising:
a beam displacer disposed between the laser source and the encapsulating section, the beam displacer configured to displace the first laser beam from the second laser beam; and
a focusing lens disposed between the laser source and the encapsulating section.

17. The particle imaging system as recited in claim 13, wherein the second laser beam is polarized by about 90 degrees from the first laser beam.

18. A method of determining particle size, comprising:
producing a first laser beam and a second laser beam from a laser source;
separating the second laser beam from the first laser beam by a distance; and
passing the first laser beam through an encapsulating section, the encapsulating section configured to allow a particle to flow therethrough;
accumulating, by a digital detector, a first metric of a first intensity of a first light that passes through a lens of an imaging device, the first light diffracted from a particle that passes through the first laser beam at a first time;
accumulating, by the digital detector, a second metric of a second intensity of a second light that passes through the lens of the imaging device, the second light diffracted from the particle that passes through the second laser beam at a second time occurring after the first time, and wherein each of the first light and the second light pass through the lens; and
classifying a particle size based upon the first metric and the second metric.

19. The method of determining particle size according to claim 18, further comprising:
polarizing the second laser beam by about 90 degrees from the first laser beam.

20. The method of determining particle size according to claim 18, further comprising:
displacing the second laser beam a distance from the first laser beam upon passing the first laser beam through a beam displacer.

* * * * *